United States Patent
Prince

(10) Patent No.: US 6,890,278 B2
(45) Date of Patent: May 10, 2005

(54) CHAIN WITH SELECTIVITY ENGAGED LINKS

(76) Inventor: Jeffrey Theorin Prince, 20226 Salt Creek Ct., Grass Valley, CA (US) 95945

( * ) Notice: Subject to any disclaimer, the term of this patent is extended or adjusted under 35 U.S.C. 154(b) by 459 days.

(21) Appl. No.: 09/782,847

(22) Filed: Feb. 14, 2001

(65) Prior Publication Data

US 2002/0111236 A1 Aug. 15, 2002

(51) Int. Cl.$^7$ .......................... F16G 13/00; F16G 13/02
(52) U.S. Cl. .......................... 474/206; 474/218; 59/78; 59/84
(58) Field of Search ................................. 474/206, 207, 474/155, 152, 156, 227, 228, 218, 234, 144, 146; 59/78, 78.1, 900, 84; 138/120, 110, 118, 115; 242/374

(56) References Cited

U.S. PATENT DOCUMENTS

| | | | | |
|---|---|---|---|---|
| 3,330,105 A | * | 7/1967 | Weber | 138/120 |
| 3,382,668 A | * | 5/1968 | Berkes et al. | 138/108 |
| 3,759,035 A | * | 9/1973 | Schmidberger | 59/78.1 |
| 4,129,277 A | * | 12/1978 | Tenniswood | 59/78.1 |
| 4,141,665 A |  | 2/1979 | Snapp, Jr. | 403/102 |
| 4,635,438 A |  | 1/1987 | Rottinghaus | 59/84 |
| 4,658,577 A |  | 4/1987 | Klein | 59/78.1 |
| 4,800,714 A | * | 1/1989 | Moritz | 59/78.1 |
| 4,885,907 A |  | 12/1989 | Pappanikolaou | 59/78 |
| 4,941,316 A | * | 7/1990 | Bechtold | 59/78 |
| 5,107,672 A |  | 4/1992 | Featherstone | 59/84 |
| 5,108,350 A |  | 4/1992 | Szpakowski | 474/207 |
| 5,157,912 A |  | 10/1992 | Yoshiga et al. | 59/78 |
| 5,839,686 A | * | 11/1998 | Dybro et al. | 242/374 |
| 5,970,701 A |  | 10/1999 | Roden et al. | 59/78 |
| 6,016,844 A |  | 1/2000 | Takahashi et al. | 138/120 |
| 6,090,002 A | * | 7/2000 | Farmos | 474/218 |

\* cited by examiner

*Primary Examiner*—Marcus Charles
(74) *Attorney, Agent, or Firm*—Duane Morris LLP

(57) ABSTRACT

A chain is provided in which adjacent links are attached to one another by a coupling pin that permits the links to rotate relative to one another on a connecting axis defined by a coupling pin. The links have movable link plates and can be fixed against relative rotation or released, at least on one side of the chain, by selectively engaging or disengaging the link plates. In one embodiment a restoring force urges movable link plates outwardly on both sides of the chain, toward locking engagement with the plates of the next adjacent links. The movable link plates are depressible against the restoring force, sufficiently to permit the adjacent link plates to overlap and pivot freely. The couplings between links can be switched between fixed and free rotational states by passing them through a path with converging walls that depress the movable link plates. The chain is particularly useful as a device for positioning a tool or manipulator, and in an embodiment with movable link plates on both sides is not only switchable between rigid and flexible but each pair of links is inherently compliant in the plane of its pivot pins.

12 Claims, 5 Drawing Sheets

CHAIN WITH SELECTIVITY ENGAGED LINKS

BACKGROUND OF THE INVENTION

1. Field of the Invention

The invention relates to link chains, and in particular provides a link chain in which the connection between successive links is changeable between a rigid connection and a pivotable connection. The change can be made by displacing certain link plates against resilient bias so as to disengage them from adjacent links and permit pivoting. Preferably, this is accomplished by compressing certain links in the chain, which have laterally extending cam surfaces.

2. Prior Art

In a conventional elongated chain formed of connected links, each successive link in the chain has a body coupled by two link pins to the two adjacent links, namely the links that precede and follow the given link along the chain. Usually each link has two link plates that are laterally spaced relative to the longitudinal center line of the chain, although other chain structures are possible, such as links that alternate one and two plates, or successive links with any number of plates, etc. The link pins typically define parallel pivot axes.

An exemplary chain structure of such a description is the conventional roller chain. Each of the longitudinally connected serial links comprises two link plates that are laterally spaced by a bushing or roller. This bushing or roller engages in a rounded depression between teeth on the outer diameter of a sprocket or other similar structure for transmitting power using the chain. Some chains have flanges or tabs that protrude from certain of the link plates, providing a point at which attachments can be made to the chain.

A roller chain often has two different types of links. One type, which can be called a roller link, has two spaced hollow bushings extending between the lateral link plates. The other type, which can be called a pin link, has two spaced pivot pins, which usually are solid, extending between lateral link plates. Two successive roller links in the chain have a pin link that provides the structural connection between the roller links. The pivot pins of the pin link extend from one link plate of the pin link, through the hollow bushings of the roller plates, and attach to the other link plate of the pin link. Thus the pin links are laterally wider than the roller links, at least by a distance equal to the thickness of the link plates. The pin links are wider because their link plates straddle the outside surfaces of the roller links.

The roller chain is quite flexible, provided that the links remain in a plane that includes the longitudinal centerline of the chain. Within this plane, any two adjacent links can be relatively rotated around the common axis of the roller and the pin by which such adjacent links are connected to one another. As a limit, each of the links can be relatively rotated until it rotates forward or backward into contact with the next adjacent link.

There is a known type of chain that is structured to bend freely in one direction but not the other. In theory, such a chain is free to bend flexibly around two sprockets of an endless loop drive, but is not free to bend backwards, thus defining a flat and non-sagging bed between the sprockets for bearing weight. The links of such a chain are coupled by pivot pins located on the side of the chain facing the sprocket, at the longitudinal ends of typically block-shaped link bodies. When the chain is pivoted around a sprocket, abutting ends of the link bodies diverge. If one attempts a backward bend, the block shaped link bodies abut and the chain can only be bent "backwards" up to the point at which the links are in a straight line. An example of such a chain is disclosed in U.S. Pat. No. 5,970,701 Roden et al., which is hereby incorporated. A problem with such a chain is that a minor amount of play or looseness in the pivot pin joints due to manufacturing tolerances or other causes will permit the chain to sag. Similarly, if the abutting surfaces of the block-shaped links are individually too high or too low, the chain may be bumpy or may sag. As a result, it is often preferred to provide a rigid underlayment or track if a chain structure is to bear a load in the same plane that the chain is to flex.

In many uses for roller chains, the chain is closed in an endless loop that is of the length needed to pass around sprockets that are mounted at fixed rotation points on a chassis. One of the sprockets is usually coupled to driving power and the chain transmits the power to rotate another sprocket. The chain is relatively taut between the sprockets on one side of the endless loop, due to tension exerted by the driving sprocket. The chain is typically slack between the sprockets on the other side of the endless loop, but even so is in tension between the payout point on the drive sprocket and the take-up point on the driven sprocket, due to the force of gravity and sagging of the chain.

An arrangement with one driving sprocket and one driven sprocket is just an example. Chain arrangements can have any combination of powered sprockets and idlers. The chain may follow a path that bends only toward one side, or the path may bend sinuously forward and backward. In addition to transmitting rotational power, a chain can be used to move a device linearly along the chain path, e.g., back and forth between sprockets. However, chains that are structured for pivoting or relative rotation between links are typically useful only in tension. When not subjected to tension, or when in compression, the relatively-rotatable coupled links are free to pivot and cannot be relied upon for purposes of positioning or transfer of power.

In order to tension a chain or otherwise to support such an elongated flexible item, it is necessary to provide a support or chassis that is as long as the distance between the extremes of the path of the chain. In some instances, it is not practical to provide such a supporting structure.

Regardless of whether there is any slack or looseness in the pivot joints between links of a flexible chain, the chain must sag between horizontally spaced supported points. A tensioned flexible structure can only remain straight if it has no lateral load, or if an infinite amount of tension is applied, because sagging is a vector function related to lateral loading (e.g., vertical weight of a horizontally elongated structure) and tension. The chain acts like a suspension structure for the weight of the links (plus any load thereon), and sags in a parabolic arc that is a function of the relative forces of tension and gravity load.

A chain can be structured so as to bend in one direction as in the Roden patent mentioned above, or the chain can be supported on a linear track under a span between sprockets or other support points. It is possible to envision various support structures for such a track, including the possibility of a telescoping support track. These solutions have their own problems.

In the typical chain structure discussed above, the connected links alternate between roller links and pin links. It is also possible to have a chain in which the links are all identical, for example with each link having a pin end that is slightly wider than a roller end dimensioned to attach to the pin end of an adjacent link. It is also possible to provide a chain in which the successive links are connected by structures that are wholly different than the hollow rollers and solid pins that characterize roller chains.

The present invention provides a mechanism whereby the nature of the coupling between links in a chain can be selectively changed between rigid and relatively rotatable couplings. Along a given chain run, the couplings of the links can be made rigid for some links and rotatable for others. This opens a number of inventive possibilities that are discussed below.

However, the idea of providing a chain in which the pivot connections are switched between rigid and flexible states by means of an engaging part is known per se. In Yoshiga et al., U.S. Pat. No. 5,157,912, a connecting pin engages between otherwise-pivotable links and is laterally displaceable by external contact with a constricting structure along the chain path. The displaceable part is a spring biased lateral pin that is eccentric to the link pivot axis, and not a displaceable complementary shape. Yoshiga teaches this locking function in connection with a push-pull chain, for holding constant the length of the chain. The implication appears to be that if the joints were free, the chain would shorten when pushed (longitudinally compressed), due to pivoting of the links at their joints. Yoshiga supports the chain on a track and does not teach the possibility of making a chain self supporting against sagging and potentially variable in length.

Snapp, Jr., U.S. Pat. No. 4,141,665, teaches a general purpose angularly lockable articulated joint. Although there is a complementary shape between adjacent linked members for fixing the joint against pivoting, the engagement and disengagement involves a longitudinal lengthening and shortening. This is structurally different than the present inventive arrangement wherein locking is accomplished by lateral displacement of complementary shapes.

U.S. Pat. Nos. 4,658,577—Klein, 5,108,350—Szpakowski, 5,970,701—Roden et al. and 6,016,844—Takahashi et al. teach limits on the angle to which chain joints are permitted to pivot, in one direction. Such a chain structure is sometimes called a "Woods chain." The disclosures of these patents concern a number of situations in which it is desirable to have a self-supporting chain. However, they fail to teach or suggest an arrangement similar to that discussed herein. Some other references in the general background are U.S. Pat. Nos. 4,635,438—Rottinghaus, 4,885,907—Pappanikolaou and 5,107,672—Featherstone. All the foregoing patents are hereby incorporated in their entireties.

SUMMARY OF THE INVENTION

It is an object to provide an improved support device that has the advantages of flexibility and rigidity at the same time.

It is another object to improve the art of link chains using a particular structure for rendering the couplings between particular links rigid or pivotable, and in so doing to prevent sagging without the need to support the chain.

It is a further object to provide a practical means by which a flexible chain can rigidly support or position a manipulator while at the same time movably coupling power to a device or movably positioning a device at a desired position using the same rigid supporting chain structure.

According to the invention, the chain is formed of a series of successive links, each link comprising laterally spaced link plates, and each link being coupled to the next adjacent link by a lateral pivot pin. The links alternate between two types. In one type of link, the laterally spaced link plate(s) reside at a fixed lateral position. In every second link, the link plates are laterally depressible against resilient bias from a spring, resilient pad or pneumatic cylinder, etc. When the laterally depressible plates are permitted to move laterally outwardly due to the resilient bias, complementary abutting contours of the adjacent links of said two types engage one another, and prevent relative rotation around the axis of their respective connecting pin. When depressed, the link plates of the adjacent links are mechanically engaged only by lateral pivot pins, and relative rotation is possible.

When the complementary contours of two or more adjacent links in a segment of chain are engaged, that segment becomes self-supporting. The segment cannot sag in a circumferential plane relative to the pivot pin axes. Preferably, the engaging complementary contours are laterally tapered or wedge-shaped. In this way, the resilient bias moves the lateral plates outwardly along the tapered or wedge shaped surfaces until they abut without clearance. This makes the chain segment rigid in its self-supporting state. Any looseness due to manufacturing tolerance is taken up as the wedge shaped surfaces advance over one another to a stable position.

In its locked condition, the chain can bear a force that is a function of the angle of the wedge shaped surfaces, the force exerted by the resilient bias structure, friction and similar factors. In its rigid state the chain can operate as a triggerable structure, i.e., a structure that rigidly supports a lateral load up to a given weight or force, and then gives way. Alternatively and preferably, the chain can be arranged rigidly to support any load encountered in its normal operation but to switch between flexible and rigid states where needed. For this purpose the chain can selectively be made flexible to pass around curves in a guide or on a sprocket, and then switched automatically into a rigid condition when the links thereafter become aligned. The chain can become rigid when the links are aligned in a straight line, or when the links are aligned at a predetermined angle. It is also possible to provide two or more angles at which the links become rigidly aligned.

For switching from the self-supporting state to the pivotable (bendable) state, the chain can be passed through a narrowing guide path having cam surfaces that force the laterally depressible link plates inwardly, at least on one side of the chain, and disengage the complementary contours of the depressible link plates from the adjacent fixed link plates. Such a guide surface can be provided leading into a curve, for example, such as where the chain approaches an angular diversion or a sprocket or the like. So long as the adjacent links remain angularly diverted around such a curve, the complementary contours do not re-engage and the links remain relatively rotatable. When the chain run reaches an angle at which the complementary contours again align, the contours re-engage unless the guide path is still depressing the depressible links.

Using the foregoing structure, the chain can be made to become rigid over one portion of its path, such as over a straight run where the chain positions a manipulator, and flexible over other portion of its path, for example to pass around curves such as sprockets. The chain of the invention is considered apt for supporting a manipulator over a distance through a vertically narrow space, where sagging of the chain is particularly undesirable.

Generally speaking, the invention employs laterally displaceable spring-biased complementary contours for selectively fixing the radius of curvature of a link chain by rigidly locking successive links. More particularly, this is accomplished by wedging structures that account for any play in the joints. The invention provides a chain structure that is generally useful as described, and also is applied to certain exemplary applications involving positioning of manipulators in confined but elongated spaces, varying the length of a supporting structure and otherwise providing new uses for chains.

In one possible embodiment, the inventive chain has link plates on both sides of the chain that abut with adjacent link plates in a longitudinal direction to lock. One of two longitudinally successive link plates is laterally depressible to unlock, namely to laterally move the longitudinally abutting surfaces clear and to permit the link plates to overlap during pivoting of the links. A conventional roller chain is flexible in one plane, namely the plane that is commonly circumferential to all the pivot pin axes, and cannot divert out of that plane. In contrast, the inventive chain is compliant or capable of diverting from its plane if the depressible (movable) link plates are provided on both sides of the chain. The extent of diversion is a function of the span of movement of the depressible links. If the depressible link is provided on one side only, then the chain is confined to a plane that is circumferential relative to the pivot pin axes. This aspect can cause the chain to be controllably compliant, namely by selectively unlocking the movable links on both sides to render the chain compliant or to unlock one side, making the chain flexible in the circumferential plane but not compliant to diversion out of that plane.

BRIEF DESCRIPTION OF THE DRAWINGS

There are shown in the drawings embodiments of the invention as presently preferred. The invention is capable of certain variations in accordance with its scope. Accordingly, reference should be made to the appended claims rather than the exemplary embodiments shown in the drawings, for determining the scope of the invention in which exclusive rights are claimed. In the drawings.

DETAILED DESCRIPTION OF THE PREFERRED EMBODIMENTS

Figure 1:
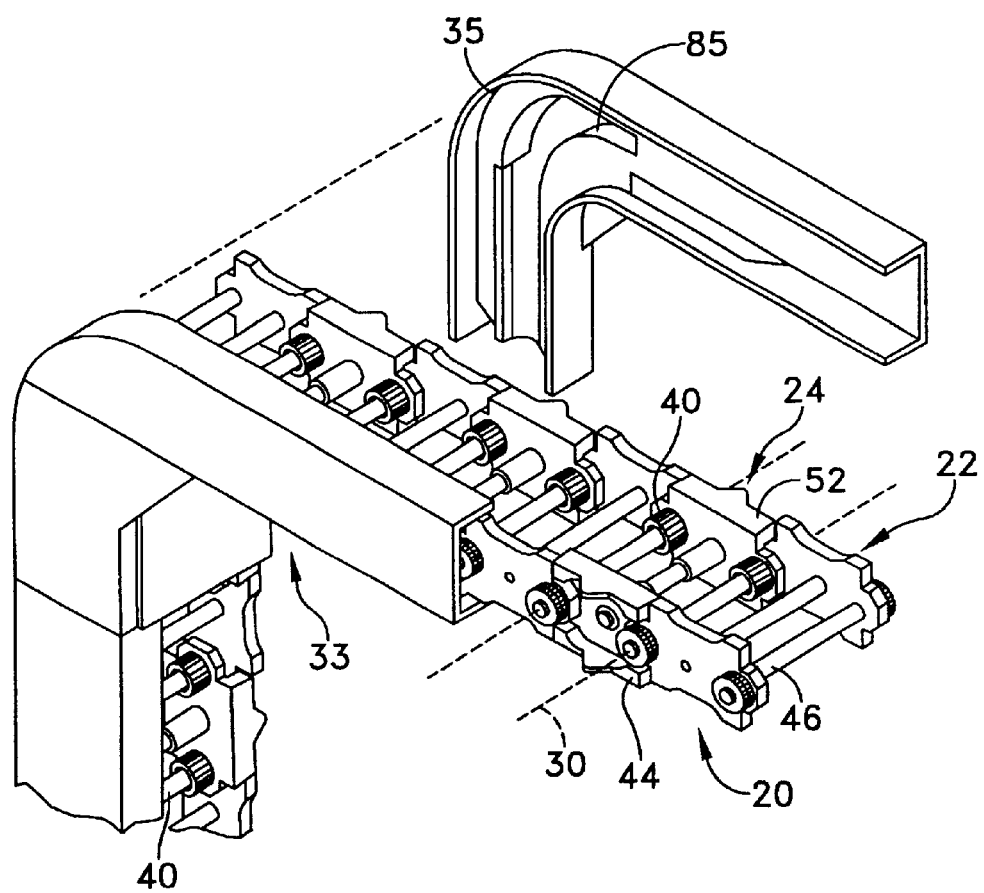
FIG. 1 is a perspective view of a chain according to the invention, traversing a contoured track (shown exploded).

An exemplary embodiment of the invention is shown in FIGS. 1–9. The illustrated embodiment comprises two types of chain links 22, 24 that are coupled alternately to provide a serial chain 20 of indefinite length.

The chain 20 generally has a plurality of links of a first type and a second type 22, 24, alternating with one another along a longitudinal length of the chain. Each adjacent pair 22, 24 of the links is movably attached for relative rotation on a pivot axis 30, namely by a pivot or roller pin 40. According to an inventive aspect, the links of the first and second types have longitudinally abutting surfaces 54, 56 that prevent the links of the first and second type from rotating relative to one another on the axis 30 when engaged. However, at least one of the links 24 of the first and second types is displaceable sufficiently to disengage the longitudinally abutting surfaces 54, 56 of adjacent links in a pair to permit relative rotation. This can be accomplished by engaging the displaceable links 24 against the bias of a resilient element such as a spring 52 using portions 35 of a track to press links 24 laterally inwardly. The track, for example, can have elements that define a curving arc 33 in association with converging surfaces 35, for contacting and displacing the displaceable links 24 to permit pivoting. After emerging from the track or otherwise being brought back into alignment in the absence of a structure that presses the displaceable links 24 inwardly, the resilient bias causes links 22, 24 to re-engage and again render the chain 20 rigid.

In this way, the chain is converted along certain portions of its length between functioning as a rigid structure and a structure that is flexible at least on one plane. As a rigid structure, a length of the chain can define a straight bar, a curved arc or another shape that comprises rigidly coupled serial links. Where the chain is in a flexible state, it can bend freely in a plane that is circumferential relative to the pivot axes of the pins joining the links, in a manner similar to a roller chain. According to a preferred structure as described herein, the structure tending to lock the adjacent links can comprise resiliently biased laterally displaceable link plates. According to that structure the chain is also capable of bending compliantly in response to a force that bears against one lateral side of the chain (as opposed to a balanced symmetrical force tending to constrict opposed displaceable link plates).

For convenience in this description, the axis of elongation of the chain is generally considered the "longitudinal" direction, unless otherwise noted. The width of the chain links 22, 24, which is the thickness defined by and between the spaced plates defining the links, is termed the "lateral" direction. The lateral direction is thus the same as an axial direction with respect to the axes of the pivot pins joining the links. In general, the terms longitudinal and lateral will refer to the extension of chain 20 unless otherwise noted. Notwithstanding these presumptions, terms with circular or rotational implications, such as pivoting, rotation, circumferential planes, diameters and radii, generally refer to the pivot axis of the pins or shafts that couple adjacent links in the chain.

In the exemplary arrangement shown, each of the two link types 22, 24 has an identical coupling structure at both of its opposite ends. The coupling structure of each link 22 or 24 is complementary with the coupling structure of the other type of link 24 or 22. It is also possible to embody the invention with more than two types of links, or to have only one type of link that is different on its opposite ends.

For example, the links of the two types 22, 24 as shown could have different intermediate structures between identical coupling ends, such as different sorts of functional structures or attachment points for carrying other articles apart from the links themselves, whereby the links have different functions. Any number of functionally different links can be coupled together into a chain using alternate coupling structures, for example as shown in FIGS. 1–9, with each link having one of two complementary couplings at each of its opposite ends, which can couple to the other complementary coupling structure. Alternatively, as noted above, a given type of link can have one end that corresponds to one of the depicted links 22 and another end that functions as the other type 24. In any event, the chain 20 has links 22, 24 with complementary ends that engage as discussed.

The chain 20 can be coupled in an endless loop or can have terminal free end links, defining a discrete length. The intermediate and/or ending links can have other structures attached to them (not shown) or can serve only as a mechanical connection between their two adjacent links.

Each pair of adjacent links 22, 24 is mechanically coupled in a manner that defines a pivot axis 30 for relative rotation between the two adjacent links. The pivot axes 30 of successive pairs of adjacent links 22, 24 are preferably parallel to one another and perpendicular to a longitudinal extension of chain 20. The pivotal connection of links 22, 24 via pivot pins or shafts 40 can generally resemble the structure of a roller chain. The chain can be used in many of the same ways as a conventional roller chain. Some examples of uses include coupling power between sprockets or other chain engaging structures (not shown), positioning articles or manipulators by attaching them in one way or another to particular links, etc.

According to an inventive aspect, chain 20 is selectively made flexible or rigid along limited portions of the chain run, by movably changing the nature of the coupling between successive adjacent links 22, 24 from rigid to rotational or rotational to rigid. This can be done on the fly, by moving the chain links relative to a contacting structure (or moving the contacting structure relative to the chain) so as to displace certain movable links that operate as control structures for switching between rigid and flexible states. One of the links 24 has a movable link plate 44 that is displaceable between positions in which pairs of adjacent links 22, 24 are locked against relative rotation on the pivot axis 30 that joins them, or are permitted to rotate relative to one another on the axis 30. In this way, the chain can have a run of adjacent links that are self-supporting over an indefinite and variable length. The chain may transmit power in tension or compression. It may be straight or curved. If straight and horizontal, the chain in its rigid state does not sag in a parabolic arc. The same chain at different points can pivot between sections that are rigid bars or can be sinuously flexible to follow a path of changing directions, conforming for example to bends, changes in bending direction, changes in bending radius and similar diversions along the path.

FIG. 1 shows a longitudinal length of chain 20 that passes through an arc such as a right angle 33 relative to the longitudinal direction. This arc has an axis of curvature that is parallel to the axes 30 on which the successive links 22, 24 are pivotally attached to one another. The right angle 33 can be defined by one or more track-defining elements 35 as shown, and can further include a sprocket (not shown) with a shaft parallel to the pivoting axes of the coupled links or similar arrangements. According to the invention, each of the successive links 22, 24 is structured so as to be freely pivotable relative to the leading and following two adjacent links, when passing around a given part of the chain run, in this case around the arc 33, and to rigidly engage its two adjacent links, preventing relative rotation, at other points along the chain run.

The adjacent attached links 22, 24 have pivotal couplings comprising a pin or shaft 40 that extends between two laterally spaced plates 44 or 46 forming the respective links 22, 24, which pin or shaft 40 normally guides relative rotation of the links. The links also have engageable/disengageable complementary surfaces 54, 56 that are eccentric relative to the pivot axis, i.e., are spaced radially from the pivot axis, and abut to prevent relative rotation of adjacent links 22, 24 when engaged. The two alternating coupling types provided along chain 20 have complementary surfaces, for example, corresponding to planes that are normal to the longitudinal extension of chain 20. In the embodiment shown, the complementary surfaces are lateral planar surfaces approximately parallel to the axes 30 of the pivot pins 40. However the complementary surfaces need not intersect the pivot axes and will prevent rotation if aligned at any abutment surface that does not shear along a line that is circular around the pivot axes. The abutment of the complementary surfaces prevents relative rotation of the adjacent links around relative rotation axes defined by connecting pivot pins defining axes perpendicular to the longitudinal axis of the chain. At the same time, the complementary surfaces are displaceable and can be brought into abutment or moved to clear them from abutment when the chain is to be rendered flexible across the mechanical coupling between the associated links.

In the embodiment shown, at least one of the links 24 has one or two laterally spaced link plates 44 that can be displaced laterally of the chain extension so as to disengage the longitudinally abutting surfaces 54, 56 (or at least one type of coupling has a portion that can be displaced if the links have two distinct couplings at their opposite ends). As shown, this is accomplished in a durable and effective manner by structuring the links 22, 24 as pairs of link plates 44 or 46 and mounting the links such that at least one of the link plates 44 of each pivotal coupling is movable toward and/or away from the longitudinal center line of chain 20 over a span sufficient to cause the abutting eccentric (non-circular) surfaces 56 of the movable link plate 44 to move into engagement or out of engagement with a corresponding complementary surface 54 of the other type of link plate 46.

In the depicted embodiment, the longitudinally adjacent coupling structures define surfaces extending radially on diametrically opposite sides of the pivot axes 30. These surfaces define shoulders 54 on the chassis link plates 46 that abut against spaced edges 56 on the movable link plates 44 to prevent relative rotation of the links around the pivot axis 50, provided that the link plates 44, 46 of the two link types 22, 24 are coplanar. The shoulders 54 and edges 56 need not be radial to the link pins, and could also be located longitudinally nearer to the end of the link or farther from the end than the pivot axis. In any event, engagement renders the chain rigid. The movable link plates 44 can be displaced out of this coplanar position, preferably against a restoring force such as resilient bias from a spring or the like, such that the shoulders no longer abut. In this position the links can overlap, allowing for relative rotation of the adjacent links on axes 30. Inasmuch as adjacent links are locked or unlocked independently, a selected length of the chain can be made flexible while another is rigid at the same time.

In the preferred arrangement, the chain 20 is rigid when the links 22, 24 are in a straight line (provided the movable links have not been displaced against the restoring force). It is also possible for the couplings to become rigid at a particular angle of relative rotation (i.e., other than a straight in-line alignment), thereby fixing the successive links to define a rigid chain run having a predetermined radius of curvature. This merely requires re-aligning the complementary surfaces 54, 56, for example to cross the longitudinal extension of chain 20 at an angle, rather than perpendicular to the longitudinal extension as shown in FIG. 2.

It is also possible to structure the links to engage at a plurality of selectable angles (not shown), for example defined by step-wise edges in the longitudinally abutting complementary surfaces 54, 56 of the link plates. This can cause adjacent links 22, 24 to become angularly fixed at a selected radius of curvature of the chain, namely at the relative pivot angle between adjacent links that is defined by a selected one of the plurality of angles. It is also possible to provide similar structures that can fix some of the couplings at one angle and other couplings at a different angle, either by providing links with different characteristic angles at different points along the chain, or by providing links that can assume different angles. The links are controlled accordingly at selected lengths of the chain to define the required combination of arcs and/or straight and flexible sections.

Figure 2:
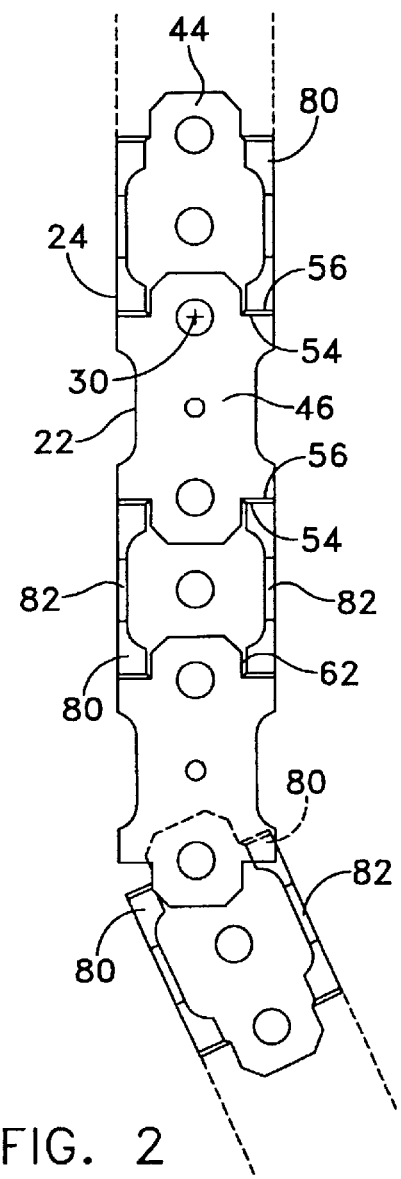
FIG. 2 is an elevation view of a length of chain according to the invention.
Figure 3:
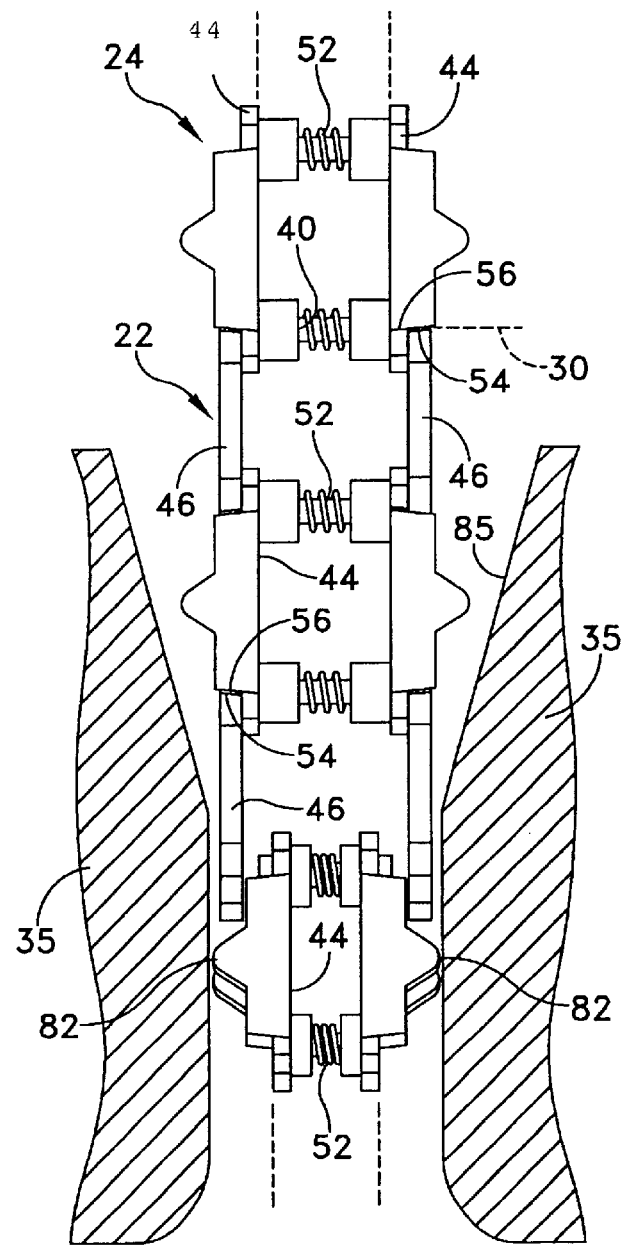
FIG. 3 is a partial elevation view, partly in section, showing a lateral side of the chain of FIG. 2.

FIG. 2 shows in greater detail a preferred embodiment wherein there are two distinct types of links and the links are arranged to lock in a straight line in one state, or upon displacement of the control link plate 44 to pivot freely in another state. In the pivoting state, the links are free to pivot within limits reached when one link is pivoted all the way back against the adjacent link. FIG. 3 is a partial section view that corresponds to a side view of the chain as shown in FIG. 2, including a depiction of chain 20 entering a track structure having a constricting path defined by converging elements 35, for switching between an engaged state and a disengaged pivotable state.

The respective links 22, 24 each comprise plates or similar parts 44, 46 that abut on their end surfaces 54, 56, as described in more detail below. The links 22, 24 alternate, with a chassis link 22 placed between and attached to each movable-plate link 24, and vice versa. The links are relatively rotatable only when the plates 44 of one of the two types of links, namely the movable plate link 24 (which also could be called a control link) are depressed laterally inwardly to a position where part of the movable-plate link and the otherwise coplanar chassis link plate are clear to lap over one another. In the embodiment shown, both plates of the movable plate link are depressed in order to permit pivoting. It is also possible to embody the chain such that one of the lateral plates of the movable plate link 24 is depressible and the other plate is stationary. In that case the stationary link plate is mounted to pivot freely relative to the adjacent link, and only the movable link plate is arranged to lock and unlock as described. If a movable link plate 24 is provided only on one side, and the other link plate is of a conventional roller chain structure, the chain links are restricted by said other link to occupying a single circumferential plane that is common to the pivot pin axes coupling all the links. If movable link plates 24 are provided on both lateral sides, the chain becomes compliant to forces that would bend the chain out of a single common circumferential plane, at least up to the extent to which the link plates are laterally movable. This aspect of the inventive chain structure is discussed in more detail below.

Preferably, the chassis links 22 and the movable plate links 24 each comprise two laterally spaced link plates. The chassis link 22 preferably is a rigid structure comprising two parallel link plates 46 that are spaced laterally of the direction of chain elongation, and are joined by two longitudinally spaced parallel pivot pins or shafts 40 that define the inter-link rotation axes 30. The chassis link 22 is shown in an exploded perspective in FIG. 4 and the chassis link plate 46 is shown in elevation views in FIGS. 8 and 9. The chassis link 22 is a box-like rectilinear structure with mutually perpendicular link plates and pivot pins attached together. The chassis link 22 provides a structural connection between the movable-plate links 24 and generally functions in a manner that is similar to a pin link that joins adjacent roller links in a roller chain.

The movable-plate link or control link 24 likewise preferably has two parallel plates 44. Unlike a roller chain, which has parallel roller link plates that are rigidly spaced, the movable plate links 24 are slidably mounted on the pivot pins or shafts 40 of the two adjacent chassis links 22 and can move laterally inwardly and outwardly as well as pivoting. Additionally, a restoring force element is provided to urge the movable link toward one of the two states (toward the locking state in the embodiment shown). In this arrangement, the restoring force is provided by a resiliently compressible biasing structure. For example, a helical spring 52 can be mounted on each pin or shaft between the movable plate links to apply a force to urge the movable plates 44 towards a position in which they lock non-rotatably with the chassis link plates 46. The restoring force could be provided by a different form of spring, such as a Belleville washer or disc spring. In lieu of a spring or washer, a resiliently compressible pad structure can be provided. In a large link chain, it may be practical to provide a suitably large scale restoring force means for the links, such as a pneumatic cylinder, etc.

Assuming that chain 20 is locked in a rigid state and is progressing toward the curve 33 shown in FIG. 2, the links approaching the curve are disposed in longitudinal abutment at corresponding shoulders 54 of the chassis link plates 46, which bear against complementary wedged surfaces 56 of the movable plate links 44. These inclined or wedge shaped bearing surfaces 54, 56 are complementary portions of respective rigid bodies (namely the link plates) and they are spaced from the rotation axis 30 defined by the pins 40. As a result, engagement of the shoulders 54 and wedge surfaces 56 rigidly fixes that coupling between the respective links 22, 24 against relative rotation on the pin axis 30. The chain is a rigid bar along this portion of its extension. The engaged links are capable of acting in tension or compression and the chain does not sag.

In the embodiment shown, the default or rest state assumed by the chain is a rigidly locked state. In an alternative embodiment (not shown), it is possible to arrange the invention such that the default or rest state is the flexible state. In that case the complementary shoulders would engage when the movable links are displaced against the restoring force instead of vice versa.

In the embodiment of FIGS. 1–9, the laterally depressible movable link plates 44 and the laterally stationary chassis link plates 46 engage via their longitudinally facing complementary abutting wedge surfaces, and there is a slight space around the laterally outer edges 62 of the chassis link plates that are disposed longitudinally beyond the wedge surfaces at the shoulders 54 (namely the "head" portion of the chassis link plate beyond shoulders 54). This portion, which may have a through opening for the pivot pin 40, extends between raised side walls 64 of the movable link plate 24 in the locking position of the links. The movable link plate 44 must be depressible laterally inwardly sufficiently to clear the raised side walls 64, the ends of which define wedge surfaces 56, to permit pivoting. Therefore, the laterally outward surfaces 62 can be made precisely complementary with the space between the raised or cammed side walls 64 of movable link plate 44, rather than leaving a space as shown, to make the connection even more rigid. A slight space is preferred to prevent binding.

The movable link plates 44 have portions that extend laterally outwardly from chain 20 by a distance greater than the thickness of the chassis link plates 46, which portions are on the cammed side walls 64 of the movable link plate 44. Referring to FIGS. 1 and 3, when chain 20 encounters a track or similar obstruction 35 that narrows along the path of the chain, a force is exerted to press the movable link plates 44 toward one another. The movable link plates 44 are depressible by a sufficient distance that the longitudinally abutting shoulders 54 of the chassis plates 22 and wedge surfaces 56 of the movable plates 44 can be passed laterally beyond one another to no longer abut. The adjacent link plates 44, 46 are then free to rotate relative to one another. The link plates 44, 46 and the formerly-abutting longitudinally facing surfaces of the plates 54, 56, lap over each other as shown in FIG. 3.

Figure 5:
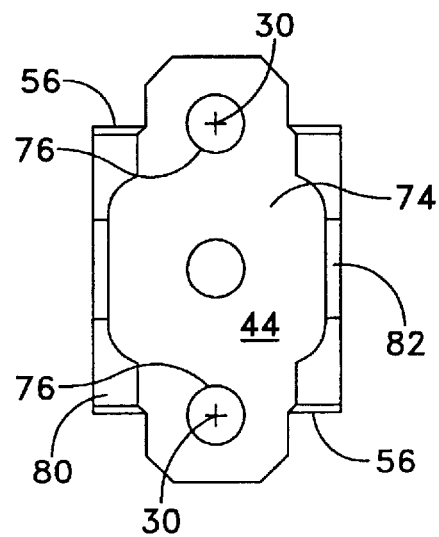
FIG. 5 is an elevation view of a depressible link according to a preferred arrangement.
Figure 6:
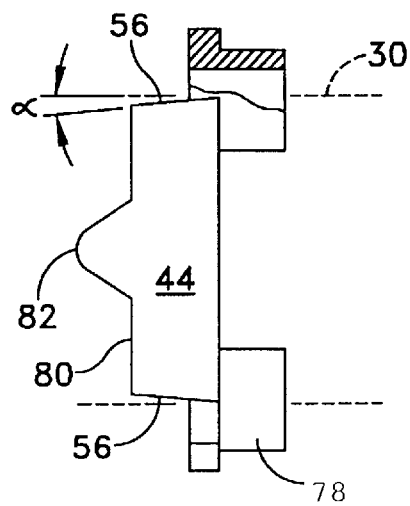
FIG. 6 is an elevation view of the depressible link from the right in FIG. 5.
Figure 7:
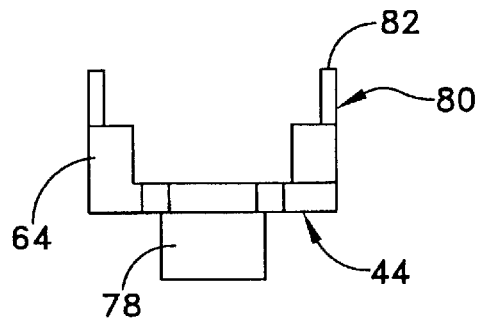
FIG. 7 is an elevation view of the depressible link from the top or bottom in FIG. 5.
Figure 8:
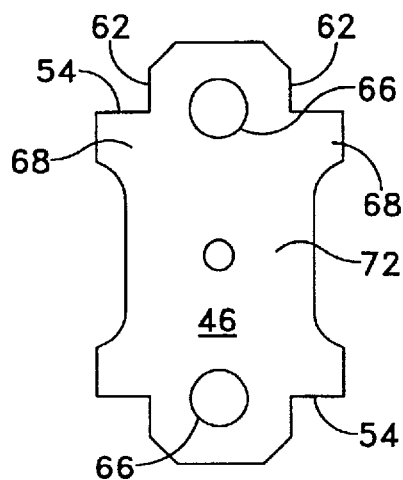
FIG. 8 is an elevation view of an alternating non-depressible link that is provided in the inventive chain between links as shown in FIGS. 5–7.
Figure 9:
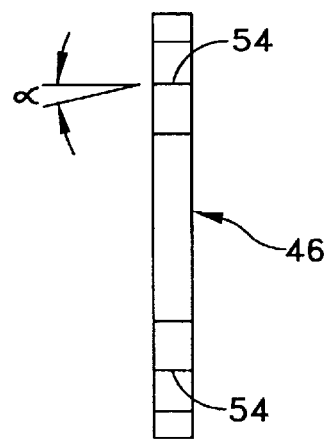
FIG. 9 is an elevation view from the right in FIG. 8.

FIGS. 5–7 show an exemplary movable link plate 44 and FIGS. 8 and 9 show an exemplary chassis link plate 46. The preferred chassis link plate 46 is substantially flat as shown and has two longitudinally spaced bores 66 for the pins or shafts (not shown in FIGS. 8–9) that extend laterally between the chassis link plates 44. The chassis link plate has extensions or arms 68 that extend laterally from the body or central part 72 of the plate and have abutting surfaces 54 that are spaced from the pin axis 30. In the embodiment shown, the abutting surfaces 54, 56, which are complementary, extend substantially transverse to the longitudinal center line of chain 20 at a point that corresponds to the pin axis 30 and thus is substantially radial to the axis of the pin. A similar structure is provided at each end of the chassis link plate 46. Likewise, similar wedge shaped edges 56 are provided at the ends of the cam side walls 64 of each movable link plate 44.

Although each complementary abutting surface is transverse to the chain center line, the abutting surface is sloped by an angle ∀ relative to the plane of the associated link plate. This provides a wedging surface operating in a longitudinal direction relative to the chain. The wedging surface is such that a restoring force that would advance the movable link plate in the resilient bias direction relative to the chassis link plate, produces a corresponding longitudinal separation or chain stretching force, the relationship of these forces being a function of the wedging angle.

Preferably, the movable link plate and the chassis link plate have exactly corresponding wedge surface angles, namely the same angle ∀ relative to a plane parallel to the longitudinal axis of the chain. The restoring force or spring biasing means that urges the movable link plate 44 outwardly, bears against the movable link plate 24 and serves both to stretch and to angularly lock the chain across the pivot pin joint.

Figure 10:
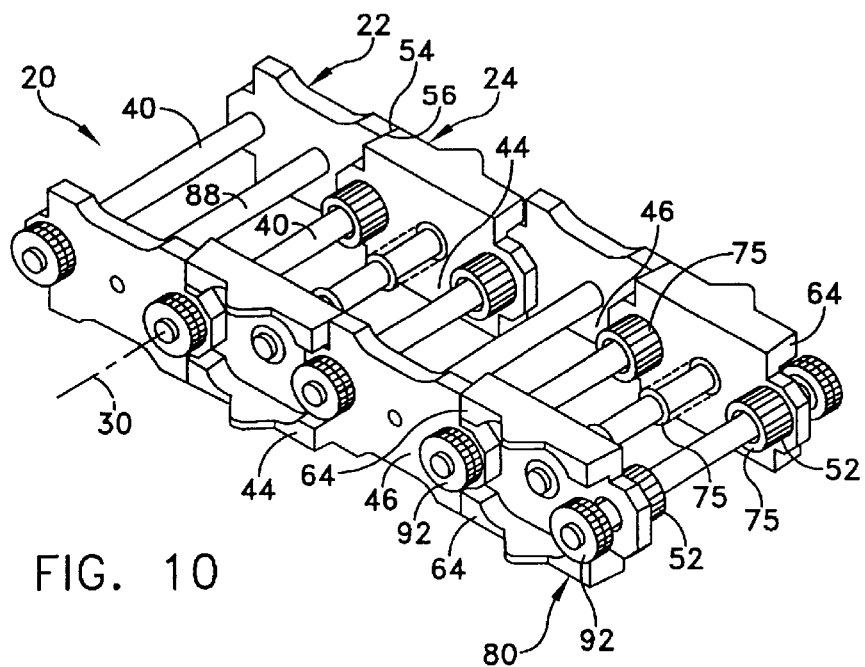
FIG. 10 is a perspective view showing a section of chain according to another embodiment.

The restoring force can be supplied in various ways. In the embodiment shown in FIGS. 3 and 4, a single helical compression spring 52 is placed on each pivot pin. An alternative embodiment is shown in FIG. 10. In this arrangement, separate and independent springs are provided for each end of the pivot pin 40. The separate springs can be compressed between the movable link plate 44 and a split ring fastener 75 in an annular groove or a similar axial fixing structure (e.g., a shoulder formed on the pin, a set screw, a bushing, etc.). As discussed above, the helical spring is also simply an exemplary structure and could be replaced with or supplemented by other compressible structures or the like.

The movable link plate 44, shown in FIGS. 5–7, comprises a body portion that resembles the chassis link plate 46 in that there are two spaced openings 76 for rotatably and slidably receiving the pivot pin 40 for affixing each end of the movable link plate 46 to an adjacent chassis link plate 44, and wedge surfaces 56 discussed above, on a line oriented laterally of the chain centerline, radially from the pivot pin axis 30, and complementary with the surface on shoulder of the chassis link plate inclined at angle ∀ relative to the plane of the link plate 44 or 46.

Figure 4:
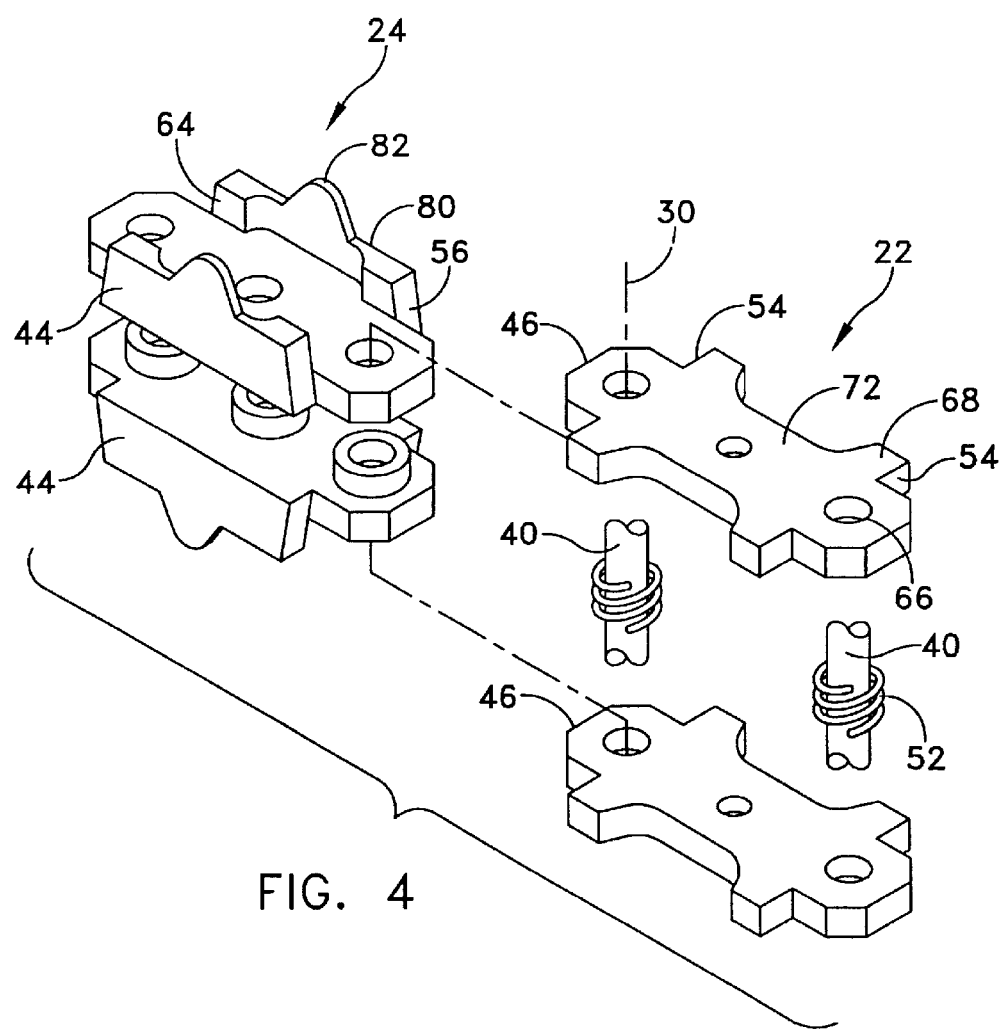
FIG. 4 is a partial perspective view of a set of links of the chain, shown separated for purposes of illustration.

The movable link plate 44 has structures that extend perpendicularly upward from the body of the movable link plate, and can have structures that extend perpendicularly downward toward the opposite movable link plate 44 (see FIGS. 4 and 7). The pivot pin 40 extends from the downward side, and can have one or more springs 52, optionally bearing against a split ring fastener 75 or the like. The movable link plate can have a rearward extending bushing portion 78 with a bore that slides on the link plate and guides the movable link plate relative to the pin, and thus relative to the chassis link plates that are rigidly attached to the pin. The underside of the movable link plate also can be flat as shown in FIG. 10.

On the upward or laterally outer-facing side, the movable link plate 44 has a side cam wall 80 on each side of the link plate 44, which in this embodiment extends approximately between the longitudinal centers of the pivot pin axes 30. The side cam wall could also extend beyond the axes 30, or it could be shorter. On the ends of each side cam wall 80 in the longitudinal direction, the movable link plate 44 has a wedge surface 56 at angle ∀, which as discussed above exerts a longitudinal stretching force on the chain as the movable link plate 44 is resiliently forced laterally by the restoring force (e.g., from spring 52) against the chassis link plate 46, which has a corresponding wedge surface 54.

Near the longitudinal midpoint of the side cam wall 80 on each side of the movable link plate 44, a peaked contact cam 82 is formed, shaped as a rounded hump. Due to the peaked cam 82, the side cam wall extends laterally above the adjacent flat end parts of the side cam wall leading up to the wedge surfaces 56. Preferably the peaked cam 82 extends above these surfaces by a distance that is slightly greater than the thickness of the chassis link plate 46. This distance is needed because when the movable link plate 44 is depressed by contact with a constricting pathway such as the inwardly tapering surfaces 85 of the track elements 35, the movable link plate 44 needs to be depressed far enough to clear the chassis link plate and permit pivoting. As shown in FIG. 3, therefore, the cam peak 82 is high enough to move the adjacent flat face of cam side wall 80 to a point where the cam side wall can lap under the inner surface of the chassis link plate 46.

When the chain is passed between opposed surfaces 85 defining a narrowing lateral space for the chain, or when a force is otherwise exerted against the movable link plates, for example by bearing against the peaked contact cam 82, the movable link plate is pressed inwardly toward the chain center line against the bias of the spring(s) 52 on the pivot pins 40 urging the movable link plate 44 to a position at which its abutting surface clears that of chassis link plate 46. Preferably, as shown in FIGS. 1 and 3, the guiding track structure for the chain comprises lateral surfaces that narrow in the direction of chain motion and contact the peaked contact cams so as to depress the movable contact link plates laterally inwardly from a position in abutting contact with their adjacent chassis link plates. In the depressed position, shown at the bottom of FIGS. 2 and 3, the links are free to rotate relative to one another because the abutting surfaces are no longer aligned and the link plates of the successive links are free to lap over one another. The chain is rendered flexible, but it is necessary to provide some method such as a track or a sprocket, to cause the chain to bend around a curving path when in its flexible state.

Figure 11:
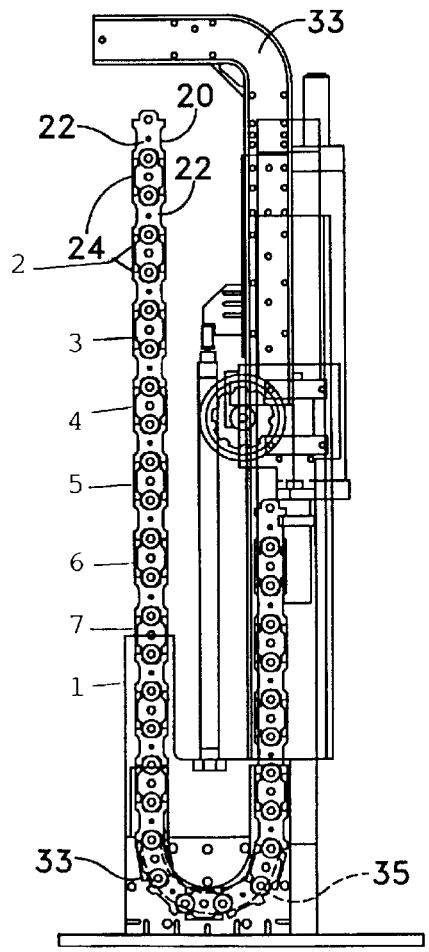
FIG. 11 is an elevation view showing an exemplary application of the invention to a device for positioning a manipulator.

The chain as shown and described is subject to variation in structure and function. The chain can be scaled up or down in size and made of one material or another as appropriate for the situation and the load to be borne. In an exemplary application, a chain as described and shown in FIG. 1 is used to position a manipulator carried on one of the links, at a selected position within a long, narrow hollow body such as a tank within an aircraft wing, for example to apply or remove a surface treatment. An apparatus for such a use is shown in FIG. 11. A wing accessway may be relatively small, such as an oval 25 by 45 cm (10 by 18 inches), that leads from the underside of the wing into a laterally elongated space that may be two meters or more in length. The invention as shown in FIG. 11 provides all the necessary structural strength to position the cantilevered weight of a manipulator and to bear the forces needed to place and to use it at the end of its traverse.

In the preferred embodiment, depressible movable link plates are provided on both sides of the chain rather than on one side only. As a result of providing movable link plates on both sides in the structure shown and described, the chain becomes deformable in a direction perpendicular to the usual plane in which a roller chain or the like is free to flex. Assuming that the chain as shown is advanced upwardly and to the left in FIG. 11 using the supporting carriage shown, for example to position a manipulator in an elongated space, it could occur that the carriage may become misaligned, causing the chain to be directed to the left or right of the center of the space, and to encounter a side wall. All the links of a conventional roller chain are limited to occupying a plane that is circumferential relative to the pivot axes between the links, and all the links must occupy the same plane. The depressible/movable control links of the invention, however, define a span of movement that permits links in the chain to move out of the common plane.

Assuming that a one-sided lateral force is exerted on the chain (a force along the axis of one of the pivot pins, not a bidirectional inward force), a movable link plate may be depressed within its span of movement. Likewise, lateral force against a chassis link plate may tighten the wedging force between that chassis link plate and the next adjacent movable link plate, and may displace the next adjacent movable link plate inwardly. Depressing a movable link on one side of the chain relative to the abutting chassis link plate could free the movable link plate and adjacent chassis link plate to rotate relative to one another. However, on the opposite side of the chain the links remain locked. A one-sided force on a movable link plate which depresses it on one side (loosen its wedging) will tighten the wedging action on the opposite side. As a result, one sided lateral force is accommodated by lateral diversion of the chain, in a stair-step progression. The chain is compliant, preventing possible damage if used to position a manipulator, but the chain remains rigid.

In an alternative embodiment, the chain may have movable-depressible link plates on one lateral side, and not on the other lateral side, which instead resembles a roller chain. In that case, lateral force on the chain will depress a movable link and free the corresponding link to pivot.

In the embodiment of FIGS. 2 and 3, the chain has a pivot pin joining each abutting set of link plates. As shown in FIGS. 1 and 10, it is possible to provide additional link pins 88 and optionally rollers therefor, at the midpoint of each of the links or link plates. These pins extend between the link plates but do not attach adjacent links together, as do the end link pins. The additional pins provide added support, can carry transverse rollers (or can be pins alone) and can engage the teeth of one or more sprockets (not shown) between the pins and possibly rollers that are at the connecting ends of the link plates. In the event that additional pins are provided between the chassis link plates, they can be simply press fit because the distance between the chassis link plates preferably is rigidly set. If additional pins are provided between the movable link plates, provision must be made for the movable link plates to be depressed, such as a spring and split ring arrangement as shown in FIG. 10.

In the embodiment for positioning a manipulator, for example using a structure as in FIG. 11, the link plates are preferably aluminum for lightweight strength. The plates preferably are anodized, which among other things affects their coefficient of friction (anodized aluminum has a coefficient of about 0.1).

The angle ∀ wedge surfaces can be chosen with several interests in mind. The angle is preferably small for good rigidity, but not so small in comparison to the width of the link plate that the wedging height can be all taken up by "bottoming out" the movable link plate. The angle is sufficiently large in comparison to the tolerance of the pivot pin joint and the thickness of the link plates, to take up any looseness in the pivot pin joints. A relatively large angle may be appropriate for embodiments with thin link plates or loosely constructed joints.

The rigidity and longitudinal bearing force produced by the wedge surfaces during of engagement between abutting links is relatively higher for angles that are relatively lower (i.e., the wedge surfaces are nearly perpendicular to the plane of the associated link plate), and vice versa. However this aspect is also affected by friction. It is believed that the optimal wedge angle is related to the friction angle of the material used (a measure of the frictional nature of the material similar to the angle of repose). Various values are possible for angle ∀. A maximum angle is 45 degrees and preferably the angle is well below 45 degrees. For anodized aluminum, an appropriate the angle can be less than ten degrees. In the illustrated embodiment the angle is four degrees.

The pivot pins 40 that join the laterally spaced links can be steel pins as used in roller chains. For the chassis links, the pivot pins can be press fit into the chassis link plates when assembling the chain. Preferably, the pins are removably attached. The pins can be formed with shoulders to bear against the link plates at bore holes and can have annular slots to receive split ring or C-shaped fasteners on the lateral outside of the link plates to ensure that the link plates are captive on the pins. Any appropriate structure that affixes similar parts can be used as well, such as screws or bolts, set screws, threads, bushings, etc.

The chain of the invention is apt for use in an endless loop embodiment or in a free-end embodiment. It is an aspect of the invention that the chain can be used in a variable-length positioning structure. Referring to FIG. 1, if the right angle track with the converging walls is not rigidly fixed to anything, advancing the chain carries along the right angle track structure. Upon eventually encountering an obstruction, the right angle track becomes stationary and the chain advances. By providing a plurality of such right angle track sections (or perhaps other angles), the chain of the invention can expand to a circuit that advances to each next obstruction and then turns, filling an available volume. This conformance to available size is particularly apt together with the chain's compliance to bending in a plane parallel to the pivot axes, as discussed above.

The chain having been described in connection with certain preferred examples, variations of the concept within the scope of the invention may now become apparent to persons skilled in the art. The invention is intended to encompass a certain range of methods and apparatus and reference should be made to the appended claims rather than the foregoing specification, to assess the scope of the invention in which exclusive rights are claimed.

I claim:

1. An elongated chain structure, comprising:
   a plurality of chassis links and movable links alternating with one another along a longitudinal length of the chain, each adjacent pair of said chassis links and said movable links being movably attached to one another for relative rotation of the pair of links on a pivot axis such that each of said chassis links has laterally spaced link plates attached to longitudinally spaced transverse pivot pins, and each of said movable links includes at least one movable link plate that is movable laterally inwardly from a position abutting one of the link plates of the chassis link to a position clear of one of said chassis link plates wherein the movable link plate comprises at least one contact cam protruding laterally from the movable link plate, whereby the movable link plate can be displaced inwardly by causing the contact cam to follow a surface having a decreasing lateral width wherein the chassis link and the movable link plate are relatively rotatable in one of said positions of the movable link plate and fixed against relative rotation in another of said positions;
   wherein said chassis links and said movable links have longitudinally abutting surfaces that differ from a circular surface around the respective pivot axis, wherein said chassis links and said movable links are prevented from rotating by the longitudinally abutting surface; and
   wherein at least one of the links of said chassis links and said movable links is displaceable sufficiently to disengage the longitudinally abutting surfaces of adjacent links for relative rotation and to re-engage for rendering the chain rigid.

2. The chain structure of claim 1 wherein the chassis link plate and the movable link plate have longitudinally facing complementary surfaces.

3. The chain structure of claim 1 wherein the links that are displaceable sufficiently to disengage comprise said movable link plates on opposite lateral sides.

4. The chain structure of claim 1 wherein the links that are displaceable sufficiently to disengage comprise said movable link plates on one of two opposite lateral sides and on the other of said two opposite lateral sides comprise a nondisplaceable link plate that is pivotally attached to at least one of the adjacent links.

5. The chain structure of claim 1 wherein the alternating links abut along complementary surfaces that are inclined relative to a lateral plane, in a direction causing the complementary surfaces to form a wedge engagement tending to longitudinally stretch the chain in a movement direction tending to lock the movable link plate against the chassis link plate.

6. The chain structure of claim 1 wherein the chain is rendered rigid with the alternating links in a substantially straight line configuration.

7. The chain structure of claim 1, wherein the movable link plate comprises a side cam wall having a supporting surface and said protruding contact cam, wherein the supporting surface defines a substantially flat support for positioning the movable link plate laterally inward of the chassis link plate when the chassis link plate and the movable link plate are relatively rotated.

8. The chain structure of claim 7, wherein the longitudinally facing complementary surfaces of the chassis link plate and the movable link plate each defines a wedging angle of less then 45 degrees relative to an axis of an associated one of the pivot pins.

9. The chain structure of claim 1 wherein the chain is rendered rigid with the alternating links in a curve having at least one radius of curvature define by a relative angle between at least two adjacent links.

10. The chain structure of claim 9, wherein the alternating links are engageable with one another at least at two selectable angles.

11. A chain comprising:
    a plurality of serially coupled links forming a longitudinal length of a chain, wherein at least some adjacent links are joined at couplings having a tolerance along the longitudinal length, the links being coupled by a movable structure having one state permitting relative rotation between the adjacent links, and another state wherein the adjacent links are fixed against relative rotation, thereby rendering the chain rigid, wherein the adjacent links are fixed by wedge surfaces when in said state where the adjacent links are fixed against said relative rotation, wherein said wedge surfaces operate to elongate the chain along the longitudinal length in said state where the adjacent links are fixed; wherein said plurality of serially coupled links comprise a plurality of chassis links and movable links alternating with one another along a longitudinal length of the chain, each adjacent pair of said chassis links and movable links being movably attached to one another for relative rotation of the pair of links on a pivot axis, wherein said chassis links and movable links have longitudinally abutting surfaces that differ from a circular surface around the respective pivot axis, wherein said chassis links and movable links are prevented from rotating by the longitudinally abutting surface; and wherein at least one of said chassis links and movable links has a movable link plate on at least one of two lateral sides, that is displaceable laterally inwardly so as to be displaceable sufficiently to disengage the longitudinally abutting surfaces of adjacent links for relative rotation and to re-engage for rendering the chain rigid; and further comprising restoring force structure associated with at least one of said chassis links and movable links, operating to urge the movable link plate in one direction laterally inwardly or outwardly, for one of locking and unlocking the chain, the movable link plate operating for one of unlocking and locking the chain, when moved opposite said one direction.

12. The chain of claim 11, wherein the longitudinally abutting surface of the adjacent links are complementary surfaces inclined relative to a radial plane intersecting the pivot axis, in a direction causing the complementary surfaces to form a wedge engagement tending to longitudinally stretch the chain in a movement direction tending to lock the movable link plate against the chassis link plate.

* * * * *